US006226750B1

(12) United States Patent
Trieger

(10) Patent No.: US 6,226,750 B1
(45) Date of Patent: *May 1, 2001

(54) SECURE SESSION TRACKING METHOD AND SYSTEM FOR CLIENT-SERVER ENVIRONMENT

(75) Inventor: Andrew W. Trieger, Chicago, IL (US)

(73) Assignee: ProAct Technologies Corp., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,832

(22) Filed: Jan. 20, 1998

(51) Int. Cl.[7] .................................................. H04L 12/00
(52) U.S. Cl. ......................... 713/201; 713/168; 713/171; 380/264; 380/279
(58) Field of Search .................................. 380/264, 277, 380/278, 279; 713/168, 171, 201

(56) References Cited

U.S. PATENT DOCUMENTS

| 4,799,156 | 1/1989 | Shavit et al. ........................ 364/401 |
| 5,212,789 | 5/1993 | Rago .................................... 395/600 |
| 5,287,507 | 2/1994 | Hamilton et al. ................... 395/650 |
| 5,325,297 | 6/1994 | Bird et al. ....................... 364/419.07 |
| 5,349,642 | 9/1994 | Kingdon ................................. 380/25 |
| 5,384,848 | 1/1995 | Kikuchi ................................. 380/48 |
| 5,404,523 * | 4/1995 | DellaFera et al. ................... 709/101 |
| 5,434,918 | 7/1995 | Kung et al. ........................... 380/25 |
| 5,455,953 | 10/1995 | Russell ............................... 395/739 |

(List continued on next page.)

FOREIGN PATENT DOCUMENTS

| 2658635 | 6/1991 | (FR) | ............................... G06F/15/21 |
| 9300266 | 10/1993 | (NL) | ................................. G07F/7/00 |

OTHER PUBLICATIONS

Website: Java Web Server 1.1 Beta, http://lorelei.interactivecorp.com:8080/system/doc/session_track/ Session-Tr.htn, "Session Tracking," pp. 1–8.

Website: http//www.w3.org/Protocols/rfc1945/rfc1945, "Hypernet Transfer Protocol—HTTP/1.0," T. Berners–Lee, R. Fielding and H. Frystyk, pp. 1–52, May 1996.

Website: http//www.internic.net/rfc/rfc2109.txt, "HTTP State Management Mechanism," D. Kristol and L. Montulli, pp. 1–19, Feb. 1997.

*Primary Examiner*—Thomas R. Peeso
(74) *Attorney, Agent, or Firm*—Thomas, Kayden, Horstemeyer & Risley LLP

(57) ABSTRACT

A method and system for tracking communications in a client-server environment. The method includes the steps of sending a first request from the client to the server over a first connection, sending a first key from the server to the client over the first connection, sending the first key from the client and a second request to the server over a second connection, and sending a response to the second request and a second key distinct from the first key from the server to the client over the second connection. The system includes a client for establishing a terminal connection with a server and a server in communication with the client. The server further includes key generator means generating a plurality of keys for transmission to the client, authentication means in communication with the key generator means receiving the keys from the client to recognize the keys at the server, and discarding means linked to the key generator means for disposing of previously transmitted keys.

53 Claims, 7 Drawing Sheets

U.S. PATENT DOCUMENTS

| | | | |
|---|---|---|---|
| 5,481,612 | 1/1996 | Campana et al. | 380/25 |
| 5,495,533 | 2/1996 | Linehan et al. | 380/21 |
| 5,500,897 | 3/1996 | Hartman, Jr. | 380/25 |
| 5,586,260 | 12/1996 | Hu | 395/200.2 |
| 5,604,803 | 2/1997 | Aziz | 380/25 |
| 5,604,807 | 2/1997 | Yamaguchi et al. | 380/48 |
| 5,606,719 | 2/1997 | Nichols et al. | 395/876 |
| 5,608,800 | 3/1997 | Hoffmann et al. | 380/25 |
| 5,678,041 * | 10/1997 | Baker et al. | 707/9 |
| 5,680,461 | 10/1997 | McManis | 380/25 |
| 5,694,551 * | 12/1997 | Doyle et al. | 705/26 |
| 5,696,898 * | 12/1997 | Baker et al. | 713/201 |
| 5,710,887 * | 1/1998 | Chelliah et al. | 705/26 |
| 5,745,681 * | 4/1998 | Levine et al. | 709/200 |
| 5,758,327 * | 5/1998 | Gardner et al. | 705/26 |
| 5,774,670 * | 6/1998 | Montulli | 709/227 |
| 5,774,870 * | 6/1998 | Storey | 705/14 |
| 5,784,565 * | 7/1998 | Lewine | 709/229 |
| 5,826,242 * | 10/1998 | Montulli | 705/27 |
| 5,835,724 | 11/1998 | Smith | 709/227 |
| 5,892,924 * | 4/1999 | Lyon et al. | 709/245 |
| 5,920,705 * | 7/1999 | Lyon et al. | 370/409 |
| 5,960,411 * | 9/1999 | Hartman et al. | 705/26 |
| 5,978,799 | 11/1999 | Hirsch | 4707/4 |

* cited by examiner

Client-Server Connection

SECURE SESSION TRACKING METHOD AND SYSTEM FOR CLIENT-SERVER ENVIRONMENT

A Microfiche Appendix is included in this application and comprises 2 sheets, having a total of 175 frames. The Microfiche Appendix contains material which is subject to copyright protection under the laws of the United States and other nations. The copyright owner has no objection to the facsimile reproduction by any person of the Microfiche Appendix, as it appears in the Patent and Trademark Office patent files or records, but otherwise reserves all copyright rights whatsoever.

BACKGROUND OF THE INVENTION

The present invention generally relates to a computer client-server environment. In particular, the invention relates to a method and system for providing secure transactions and for tracking the state of communications in a public network.

In an ever-increasing fashion, networks are used to transfer data among computers throughout the world. These networks utilize a protocol in which data groups, called packets, are requested by one computer and sent by another computer. With the prevalent use of the global public network known as the Internet, computers located remotely from each other can share information by requesting and delivering these packets. In a client-server environment, the client and a server are software or hardware applications which are used to communicate in a request/response manner. The separate client and server applications can be resident on a single computer or separated by thousands of miles in separate computers connected via a network.

The world-wide web, or "Web," is one such information system implemented on the Internet. The Web is based on hypertext technology, which allows certain elements of a document or "page" to be expanded or linked to other elements elsewhere on the "Web" of interconnected computers. The Web may be viewed by users via "browsers," which essentially are local computer programs that read hypertext documents and display graphics. The Web is gated or navigable via these hypertext documents and is structured using links between these documents. The address of individual documents are known as "universal resource locators," or "URLs."

In the Web's data exchange implementation, the local computer requesting information may be considered a "client" and the computer responding to the requests may be considered a "server." Data exchange between the client and server is performed via discontinuous, unrelated and standalone request/response pairs for information. In order to more efficiently handle requests from many clients, the server initiates a new connection for every request. This connection is subsequently broken after each response is transmitted. The server is thereafter available to service a new connection requested from another client.

For every request from the same client, a new connection must be established, although this typically is done fairly quickly. Consequently, a user (or client) who has made previous requests is treated no differently from one who has not. The server responds to each request for information in the order received. Thus, if the client is accessing the server in a series of interdependent cumulative steps, the client not only must request a new connection, but must resend the results of the previous requests to the server. The existence of a new connection and a new set of requests that is sent from the client to the server is often concealed from the user. Thus, the client transparently remembers the "state" of the exchanges between the client and the server, and returns this information to the server so that the exchange can continue appropriately. Often, this "state" information is sent with the URL in each new request.

With this configuration, the state information is stored primarily at the client. If the client does not reestablish a connection with a particular server immediately, some of the state information may become irrelevant or stale as the server updates its own database information. Thus, the state information stored at the client may become irrelevant or useless after a period of time, and the client will need to reestablish the current state with a particular server again.

As the number of cumulative requests to an "interesting" server increases, however, the required amount of information that the client must send to the server also increases. An "interesting" Web application running on a server must acquire and retain state information from the client. With the bandwidth limitations of conventional phone lines or network cable, the retransmitted information increases the amount of time it takes for a client to send a request to the server and to receive a response. More importantly, valuable or confidential information, such as credit card account numbers, is repeatedly sent and is subject to increased risk of interception by undesired parties. Furthermore, should the integrity of the communications link between the client and the server be interrupted at any time, much of the state information retained at the client or the server may be lost, thereby requiring the client to proceed through a previous series of requests to establish the state where communications broke off.

The following practical example illustrates these shortcomings in the prior art. In this example, a server runs a "site," or "Web application" program, which processes mail order requests for clothing. A consumer uses his computer, the client, to purchase a pair of pants over the Internet by executing a series of requests to a server:

Request No. 1: Client requests "pants."
Client sends no state information.
In response, the server gets list of pants and sends the data back to the client.

Request No. 2: Client requests "brown" and sends state information "clothing = pants."
In response, the server gets a list of brown pants and sends the data back to the client.

Request No. 3: Client requests "show me size 32" and sends state information "color = brown"; "clothing = pants."
In response, the server retrieves a list of brown size 32 pants and sends the data back to the client.

Request No. 4: Client requests "show me cuffed" and sends state information "color = brown"; "size = 32"; "clothing = pants."
Server retrieves from its database the one cuffed brown size 32 pair of pants and sends the data back to the client.

Request No. 5: Client requests "buy these, my CC # is 1234-4321-1121-3231" and sends state information "clothing = pants"; "color = brown", "size = 32", "pantlegs = cuffed."
Server retrieves from its database the brown size 32 cuffed pants, processes the purchase using client's credit card number, and sends an appropriate response to the client.

The relationship between the client and the server is "stateless," in that their communication consists of transmissions bounded by disconnects and reconnects for each new request or response pair. The amount of data sent from the client to the server typically increases with every request by the client in order to ensure that each request from the client is recognized by the server in relation to previous requests. As those skilled in the art will appreciate, the state information sent in the final request necessarily repeats all of the state information accumulated from all previous communications within the same context. It is thus conceivable that a lengthy transaction could require the transmission of hundreds of pieces of state information between the client and server.

It is an objective of the present invention to provide a method for minimizing the amount of information to be transmitted between the client and the server during these network transactions.

It is also an objective of the present invention to increase the security and reliability of the client-server communications.

It is a further objective of the present invention to centralize and secure client-specific data and retain it at the server.

SUMMARY OF THE INVENTION

To meet the above objectives, the present invention replaces the information that tracks the results of the previous requests over established and reestablished communications links using an identifier string called a "key."Instead of an ever-increasing set of information transmitted from the client to the server and back, the embodiment described herein localizes l:he state between the client and server at the server and associates the state with the key string. The substantive information from the previous commands, requests or responses need not be retransmitted upon the establishment of each new connection with a server. Rather, the server keeps track of this information and the server and client both reference this information with only the key.

One aspect of the present invention therefore provides a method for tracking communications in a stateless client-server environment comprising the steps of sending a first request from the client to the server over a first communication link or connection, sending a first identifier from the server to the client over the first link, sending the first identifier from the client and a second request to the server over a second link, and sending a response to the second request and a second identifier distinct from the first identifier from the server to the client over the second link. The first and second identifiers are thus distinct and can identify the state of the particular client to the server by representing the present state of communications, or simply identify the client based on the last secure identifier string exchange made between the server and the client. This identification information and state information may preferably be stored at the server, thereby providing the most secure and efficient repository for state or identification-tracking data.

In another aspect of the present invention, the server performs the steps of exchanging identifiers upon receipt of a new request from a distinct client. In particular, a method is provided comprising the steps of receiving a first request from a client over a first link, sending a first identifier to the client over the first link, receiving the first identifier from the client and a second request over a second link, and sending a response to the second request and a second identifier distinct from the first identifier to the client over the second link.

In yet another aspect of the present invention, a method for tracking communications in a client-server environment is provided including the steps of establishing a first connection between a client and a server, authenticating the client at the server, generating a first key in the server corresponding to the communication session and sending the first key to the client. After disconnecting the first connection, a second connection is established between the client and server, with the client generating a request and sending the request and the first key to the server. The server verifies the first key and generates a response (optionally using any local state information previously stored at the server and associated with the first key) to the request and a second key at the server. The response and the second key are then sent back to the client. In this fashion, the server is able to keep track of the state or status of a series of communications with a particular client by internally referencing the state of such communications with keys. A new key is sent to the client along with each response to a client's request. Any subsequent communication by the client is then transmitted back to the server along with a particular key that is recognized by the server.

In another aspect of the present invention, the keys used by the server to track the state of communications sessions are interchanged or changed often, preferably by the server, before any response is sent back to the client.

In still another aspect of the present invention, a system for tracking communications in a client-server environment is provided that includes a client computer operative to establish a connection with a server computer, and a server computer in communication with the client. The server includes a key generator means generating a plurality of keys for transmission to the client, a verification means in communication with the key generator means, the verification means receiving the keys from the client to recognize the client, and a discarding means linked to the key generator means for disposing of previously transmitted keys.

In yet another aspect of the present invention, a method for tracking communications in a client-server environment is provided including the steps of establishing a first connection between a client and a server, generating a first key in the server corresponding to a session between the client and the server, sending the first key to the client, disconnecting the first connection between the client and the server, establishing a second connection between the client and the server, generating a request at the client and sending the request and the first key to the server through the second connection, recognizing the first key at the server, generating a second key at the server, the second key being unrelated to the first key, processing the request of the client at the server to generate a response, sending the response and the second key back to the client over the second connection, and disconnecting the second connection between the client and the server.

In another aspect of the present invention, the keys used to track the communications are sequential and have no information or relationship to the data being transmitted between the client and the user.

In yet another aspect of the present invention, the keys used to track the communications are randomly generated or have no sequential relationship to one another.

In still another aspect of the present invention, the keys are invalidated by the server once they are used in a request or request/response pair so that they will never be used again or at least until the occurrence of a certain event (e.g., revised after 1 year, revised after 1000 sessions, etc.).

In another aspect of the present invention, the keys are invalidated after a specified period of time has elapsed.

In yet another aspect of the present invention, a method for tracking communications in a client-server environment is provided including the steps of establishing a connection between a client and a server, receiving a first key from the server, generating a request at the client, sending the request and the first key to the server through the connection, and receiving a response to the request and a new key from the server over the connection.

The present invention thus allows for the emulation of a stateful network environment. The recognition between the client and server requires only the transmission of the new request and a key string. Thus, from the user's or client's perspective, the communication with the server appears to be stateful and permanent, since there is no retransmission of old data.

The present invention alleviates problems found in the prior art by eliminating the need for any summary retransmission of state data. While the prior art requires this information to adequately describe the new instruction to the server, the present embodiment records this information at the server, which associates the current state information of the client with an unrelated or related key value. This results in a streamlined, secure environment for network conversations.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

DETAILED DESCRIPTION OF THE PREFERRED EMBODIMENT

Figure 1:
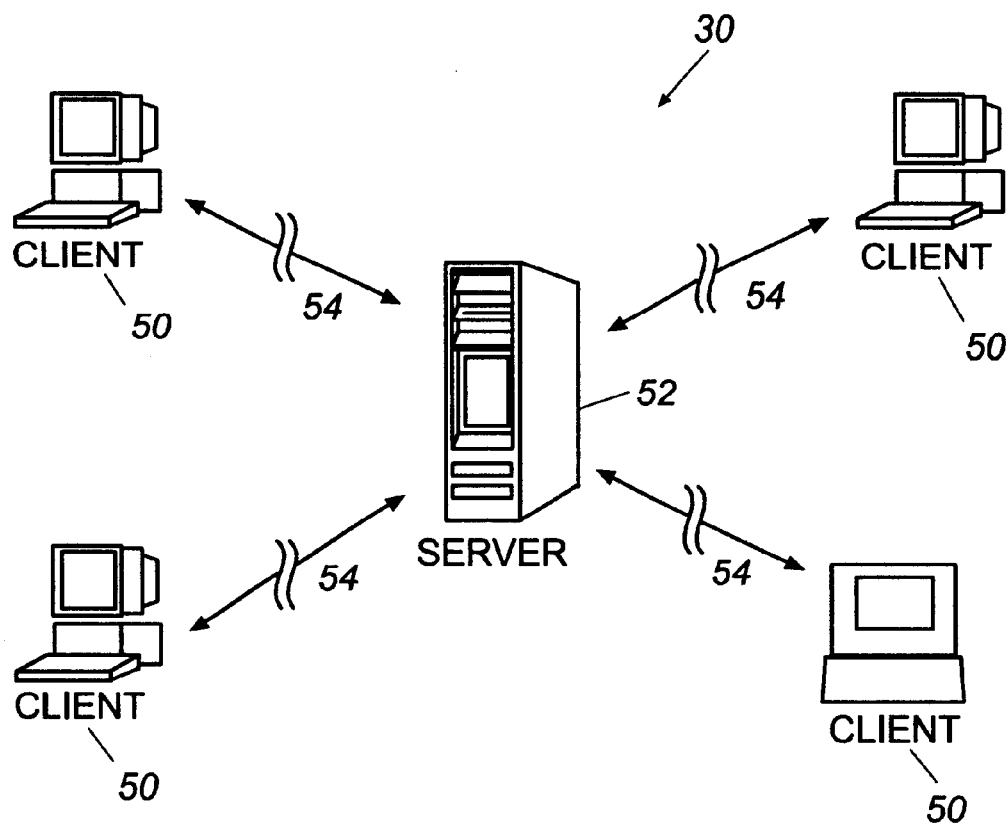
FIG. 1 is a diagram showing various client-server connections in a network system utilized in the preferred embodiment of the present invention.

A. Description Of The Stateless Client-Server Environment and The Prior Art Environment Referring now to the drawing figures, FIG. 1 is a diagram illustrating the Internet environment in which the preferred embodiment of the secure session tracking method operates. It should be noted that one skilled in the art would contemplate an implementation of the present invention in other non-Internet-based applications, and thus the present invention should not be restricted to implementation on the Internet. It shall be noted that "client" and "server" in the figures described herein need not be separate machines. A client can be any software that makes a request of a server, which is another module of running software.

Each client 50 preferably comprises a workstation which is capable of executing various computer programs and reading and/or writing to and from memory contained within the workstation. The workstations that may comprise all or part of the client may be fixed or portable personal computers adapted to operate in communication with the server 52 or the network 30. In the preferred embodiment, the client 50 may simply comprise a single personal computer or microprocessor suitable for executing computer programs and processing data information input to the computer. Suitable hardware for the client 50 as shown in FIG. 1 is a SPARCstation 5 manufactured by Sun Microsystems® Inc., having at least 64 megabytes of memory and a 1 gigabyte hard disk drive. Personal computers such as the Dell® Dimension XPS P133s, manufactured by Dell Corporation®, having the same system parameters may be implemented as the workstation for client 50. The server and workstations are platforms which can preferably utilize processors capable of executing the software in the attached Microfiche Appendix, or Microsoft® D Windows 95®, manufactured by Microsoft Corporation®. One skilled in the art would recognize that numerous configurations of hardware and software may be utilized to implement the preferred embodiment disclosed herein.

In the prior art systems on which the preferred embodiment would be implemented, the user of the network requests information via the Internet from the client 50. The server 52 receives the request and delivers the requested information back to the client 50. In this stateless Internet environment, the client 50 first establishes a logical or physical connection or link 54 with the server 52. It should be noted that the existence and/or permanency of any other connections or links between client 50 and server 52 (e.g. physical network cabling) does not affect the stateless nature of the logical connection or link 54. After establishing a connection (or link), the client 50 sends the request to the server 52 through the connection 54. After processing the request, the server 52 sends a response back to the client 50. The connection 54 is then broken or moved to an "inoperative" state by the server, the client, or both. This allows the server 52 to participate in the establishment of a new connection, receive a request, and transmit a response to another client.

If the user wishes to make another follow-up request, either based on or independent from the previous request, the client 50 must reestablish or establish a new connection 54 with the server 52. Preferably, the client 50 remembers or stores in memory through conventional means the URL, link or location of the particular server 52 or group of servers with which the client 50 was connected in the previous communication. To establish a connection, therefore, the user preferably enters the next follow-up request, and the client 50 automatically attempts a second connection with the server 52. When a second connection 54 is established, server 52 is in an initial state and does not typically recognize the client 50 from the first connection as being the same client.

In fact, in prior art systems, the server is typically in this initial state regardless of how many connections have been or will be established. This is the "stateless" nature of the client-server environment. As a result, the client 50 must communicate to the server 52 information resulting from or pertaining to previous communications in order to establish the previous "state" of communications, if client 50 wishes his new request to be processed relative to such communications. In the prior art, this is done by resending all the previous state information to the server 52 with the new request.

Figure 2:
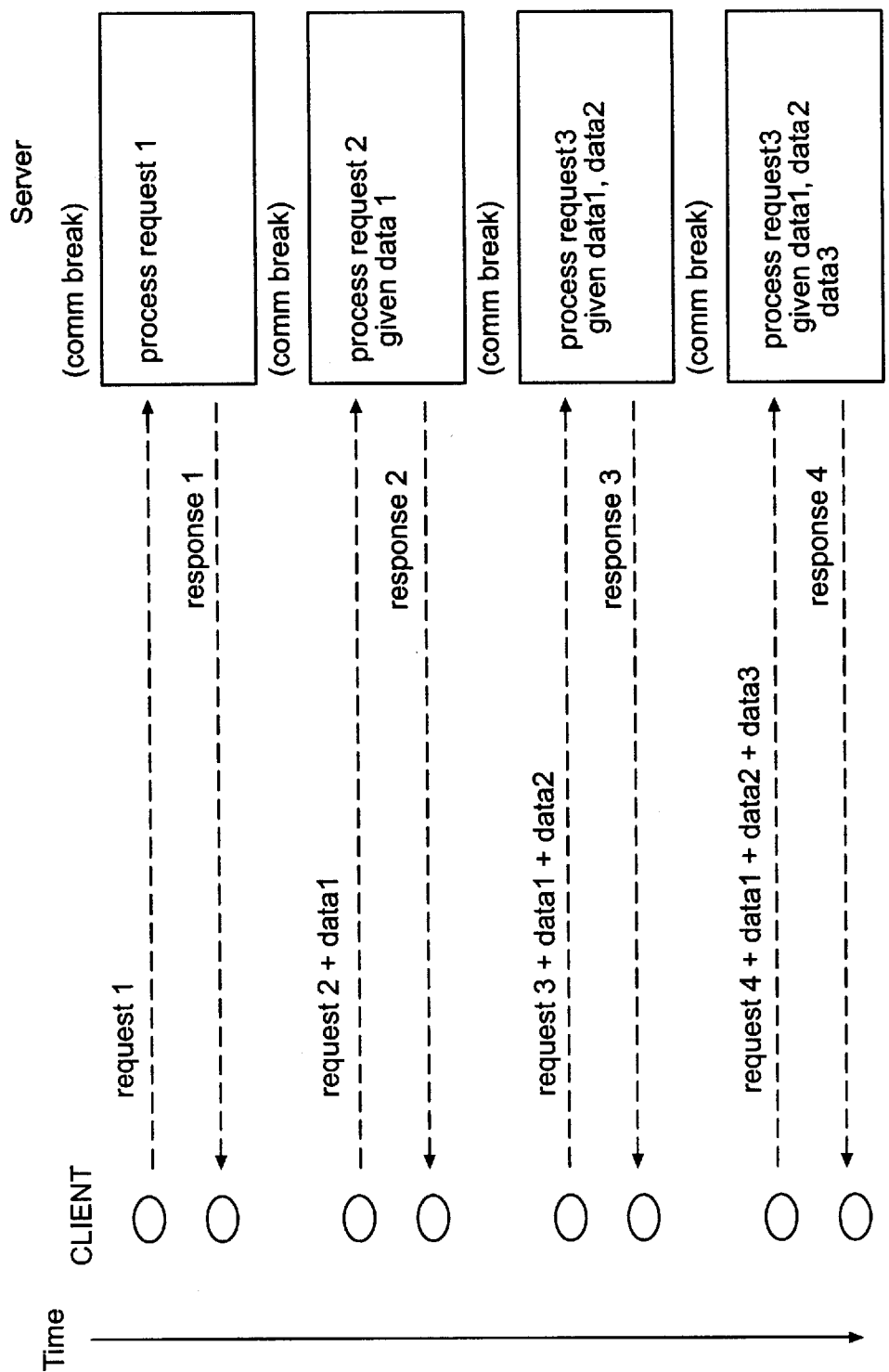
FIG. 2 is a state diagram showing a prior art client-server exchange.

FIG. 2 illustrates a state diagram of this prior art implementation, which is similar to the implementation of Example 1 previously described. As shown in FIG. 2, as time progresses from the top of the figure towards the bottom, the client sends requests to the server, and the server sends subsequent responses back to the client. Because each request and response pair is separated by a break in the connection between the server and the client, the client is forced to send data along with subsequent requests to the server so that the server will understand the state of the previous communications. For example, after the client has received a first response (response 1) from the server, the communication between the client and server is broken. At a subsequent time, the client sends a follow up request (request 2) to the server, but must send state information (data 1) that communicates to the server information relating to the previous communication between the client and the server relating to request 1. The server receives the request and processes a response based on the data (data 1) received along with the second request (request 2). A response (response 2) is then sent from the server back to the client and the communication link is broken again. In a subsequent time, the client decides to send another request (request 3) to the server. Again, the client must send state information relating to the previous requests (request 1 and request 2). This additional information (data 1 and data 2) must be sent along with the third request (request 3) to the server. The server receives the third request and processes the request in light of the state information (data 1 and data 2) and returns a response (response 3) back to the client. The communication link is then broken again. Finally, when a fourth request (request 4) is sent to the server, state information from the previous requests (data 1, data 2, and data 3) must also be sent to the server to properly establish and inform the server of the state of previous communications. As the example of FIG. 2 demonstrates, as time moves forward, the amount of information sent with the new requests increases. Furthermore, data elements relating to previous communications must be continuously resent.

B. Description Of The Method And System Of The Preferred Embodiment

In the preferred embodiment of the method described, the client 50 instead sends an identifier or "key," which the server 52 uses to identify any previously stored information for various clients. The interaction between client 50 and server 52 in the preferred embodiment is described in FIGS. 3 and 4. The creation and validation of keys at the server 52 are described in FIG. 4.

The secure session tracking method of the preferred embodiment preferably operates with an initial authentication stage to identify or recognize the user or client. This authentication procedure is shown in the flow diagram of FIG. 3.

Figure 3:
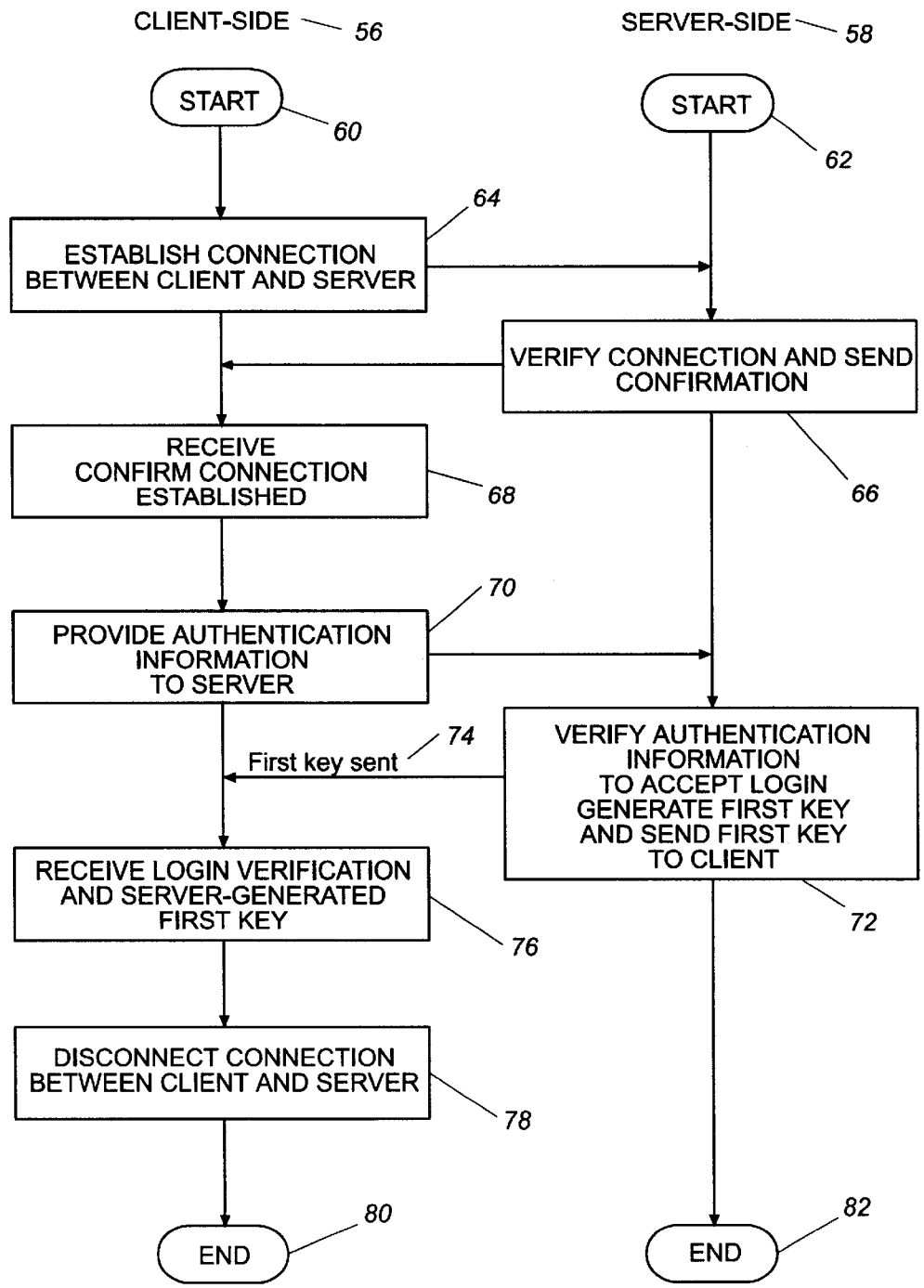
FIG. 3 is a flow diagram showing the exchange between the client and the server of FIG. 1 during an authentication operation as used in the method of the present invention.

Turning now to FIG. 3 in combination with previously discussed FIG. 1, the operations on the left side of the diagram take place at the client 50, or on the client-side 56. Similarly, operations on the right side of the diagram take place at the server 52, or on the server-side 58. Beginning at start boxes 60 and 62, the client 50 and server 52 are operating independently from each other. At step 64, the client 52 seeks and establishes a connection with the server 54. The server 54 then verifies the connection and sends a confirmation to the client 50 (step 66). The client or server essentially recognize in this step that some form of communication or acknowledgment thereof is established. Client 50 receives the confirmation (step 68), and sends authentication information, such as a password, to server 52. The server 52 receives this information and verifies the authentication information (step 72). This may be carried out using known techniques, such as by checking the password against a database of known passwords, or by recognizing the format or configuration of a password. In accordance with the present invention, if the authentication information is approved, the server 52 preferably generates a first key 74 (step 72), which is preferably a random character string from preferably base-62 character set. Preferably, the key encapsulates no data contained in the communications between the client and server. In the alternative, however, the key may actually contain state information embedded or encrypted into the character string. It should be noted that the most diverse (largest) character set from which individual characters for individual spaces in the multiple-character key are chosen is preferable. The base-62 character set includes the characters [a . . . z]+[A . . . Z]+[0 . . .9] and being at least 1 character long. This preferred character set would avoid any characters that cause problems with the software (client or server) or in transmission to allow for the most secure implementation. One skilled in the art would recognize that the length of a key utilized in the present invention can vary widely.

In response to the authentication information transmitted by client 50 in step 70, the server 52 preferably transmits an authentication verification and the first key 74 (step 72). The client 50 then receives the authentication verification and the first key (step 76). Finally, the connection between client 50 and server 52 is broken. This allows server 52 to handle requests from other clients. Boxes 80 and 82 mark the completion of the initial authentication routine. This process may be repeated if the client 50 sends an invalid key to server 52 as described below.

It is important to note that a login name and/or password is not necessarily used to recognize the client. Thus, the step 70, the verification of authorization information in step 72, or the transmission of login verification in step 76 from the server 52 to the client 50 may be eliminated while remaining within the scope of the invention. As an example, a scenario without login information can occur by establishing a connection between the client 50 and the server 52, generating a first key 74 in response to a request lacking a key or authentication information from the client 50, and transmitting it from the server 52 to the client 50.

Figure 4:
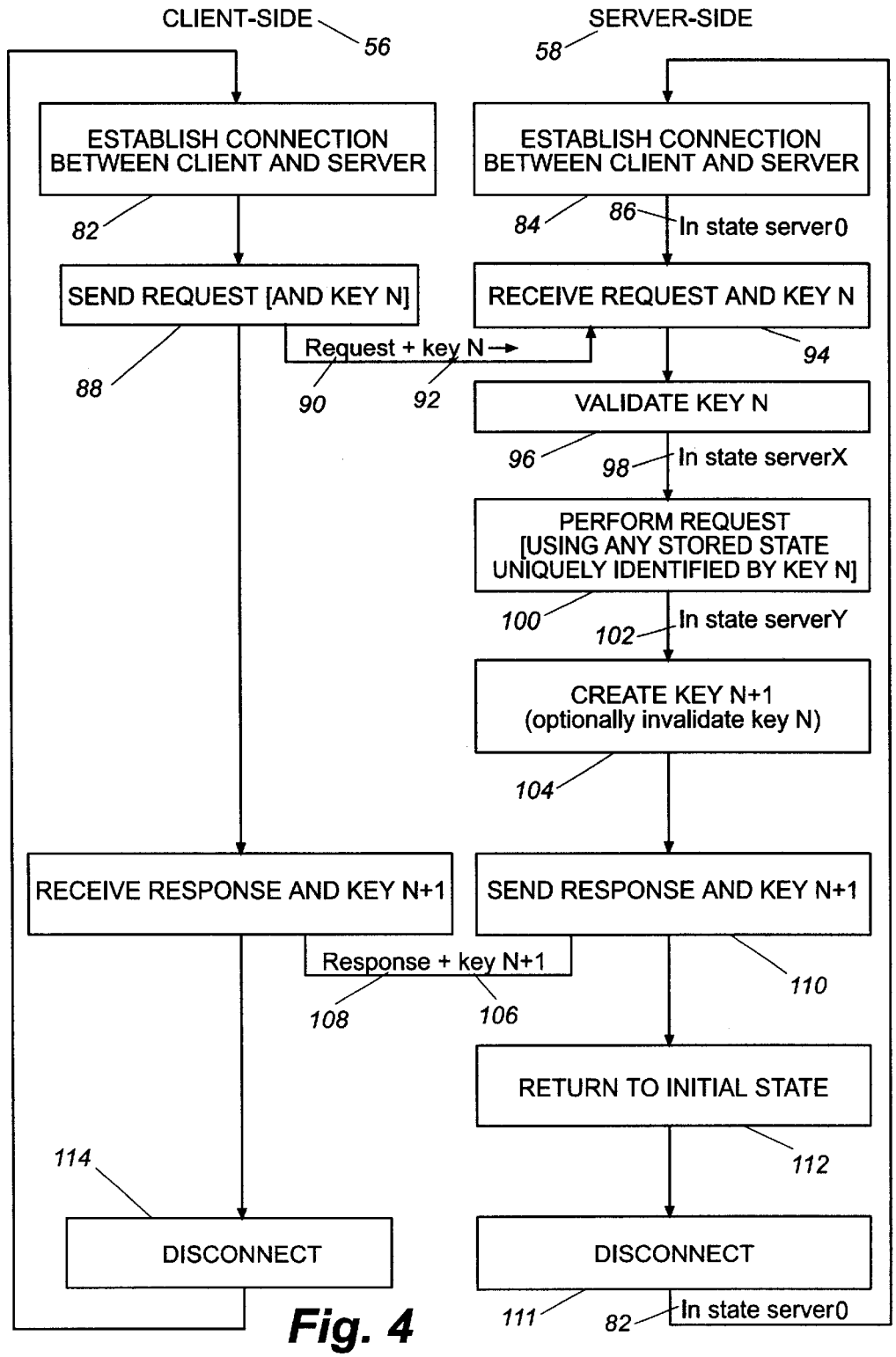
FIG. 4 is a flow diagram showing the steady-state operation for requests between the client and the server over the network shown in FIG. 1 for the method of the preferred embodiment of the present invention.

FIG. 4 illustrates the steady-state operation of the method of the preferred embodiment herein. Here, either a first key 74 or some other previously sent key has been transmitted from the server 52 to the client 50, which preferably stores the key value in memory or nonvolatile storage. As in FIG. 3, the operations on the left portion of the diagram occur at the client 50 and the operations on the right portion of the diagram occur at the server 52.

First, the client 50 and the server 52 must establish a communications connection or link. Step 82 (client-side) and step 84 (server-side) represent steps 64 through 68 in FIG. 3. After the connection is established, the server 52 is in some initial state 86. The client 50 preferably sends a request 90 and a previously sent key 92 (step 88) and the server 52 receives them (step 94). Next, the server 52 validates key 92 (step 96). Note that upon the initial communication between the client 50 and the server 52, the client will not have a key to send back to the server. Thus, the present diagram represents communications after at least an initial key is received by the client from the server.

This is preferably done by comparing the value of key 92 with key values stored in a key storage database at the server 52. However, other methods of key validation are possible. For example, the key 92 may be self-validating in that the server 52 may be able to immediately recognizing the key's information or format. The server 52 may also ensure that the key has not been timed out. For example, the server may know when the particular key was sent in a response and by comparing that time with the time of the current request, the age of the key can be determined, and the age value of the key can be compared with a predetermined time value that has been found to be an acceptable age. It is a more secure optional enhancement to disallow keys that have been assigned and unused by the client for an overly long period of time. These two processes will be described in more detail in conjunction with FIG. 5 below.

After the key 92 is validated, the server 52 uses any state information recorded in its database to process the request. The server 52 uses the key 92 to emulate a certain environment for the client 50 by keeping track of state information. As a result, it can appear to the client 50 that the server 52 has been continually connected to it since the client 50 does not have to resend every piece of state information with each new request to the server 52.

If the key 92 received in the server 52 is invalid, the server will not perform the request from the client. Optionally, the server may enter an error processing routine, eventually returning an error message to the client. Such routines are well-known in the art.

Preferably, after the initial authentication by the client 50, the state of the communications session is tracked by the server 52 and retained upon termination of the connection through transmission of a response back to the client 50. The initial state established by the server is shown as "server0" (reference numeral 86). After the server 52 performs the request 90 (step 100) using any stored state information identified by key N (92), it updates any state information it has determined may be necessary for possible future requests in a database. Next, the server creates a new key 106 (step 104). Preferably, the key is non-sequential or unrelated to the former key 92. This method is one way to increase security by ensuring that no key value can be used twice.

Finally, the server 52 sends a response 108 to the client's request and the new key 106 to the client 50 (step 110). The server 52 then returns to its initial state 86 (step 112), and the client 50 and server 52 logically or physically break the connection between them (steps 114 and 116). For any subsequent connection, the routine in FIG. 3 repeats starting at steps 82 and 84.

The keys are preferably sent between the server 52 and the client 50 via coding blocks hidden from the user. To protect the confidentiality of the information referenced by the key and to prevent unauthorized viewing of the key, the key may be encoded, encrypted or partially encrypted by a number of known conventional means. In the alternative, if encryption is not a concern, the keys may be sent as part of the URL area on the client's browser program. Furthermore, the entire response or request may be encrypted for decoding by the key or some other means.

When the preferred embodiment of the invention is applied to the client-server stateless environment which is HTTP communication (Hyper Text Transfer Protocol, the protocol used on the Internet for World Wide Web traffic), the key values are preferably stored as "cookies." This term is a known term in the context of HTTP and specifically is a means for servers to instruct clients where to store sets of information specified by the server, to be unchanged by the client, so that the client can transparently return the information to the server with subsequent requests. Other ways exist for a server to "pass" information to a client and for the client to return it with subsequent requests. In the above-stated HTTP-based environment, for example, such information may be sent in the content of an HTML document, or in the content of a link, or URL. All of these options for the storage or communication of key values are well-known to one skilled in the art.

If desired, the encryption of the key and the entire communication between client and server provides the additional advantage of discouraging any unauthorized users from attempting to decode confidential private information. Decryption of the key only would provide an unauthorized user with a meaningless character string which preferably has no direct relationship to the transmitted sensitive information apart from the sensitive data actually stored on the server. Furthermore, as will be described below, the keys preferably have a finite "lifetime," so any actual decryption of a key that might occur would not be useful indefinitely in attempting to retrieve data in an unauthorized fashion from the server 52.

Figure 5:
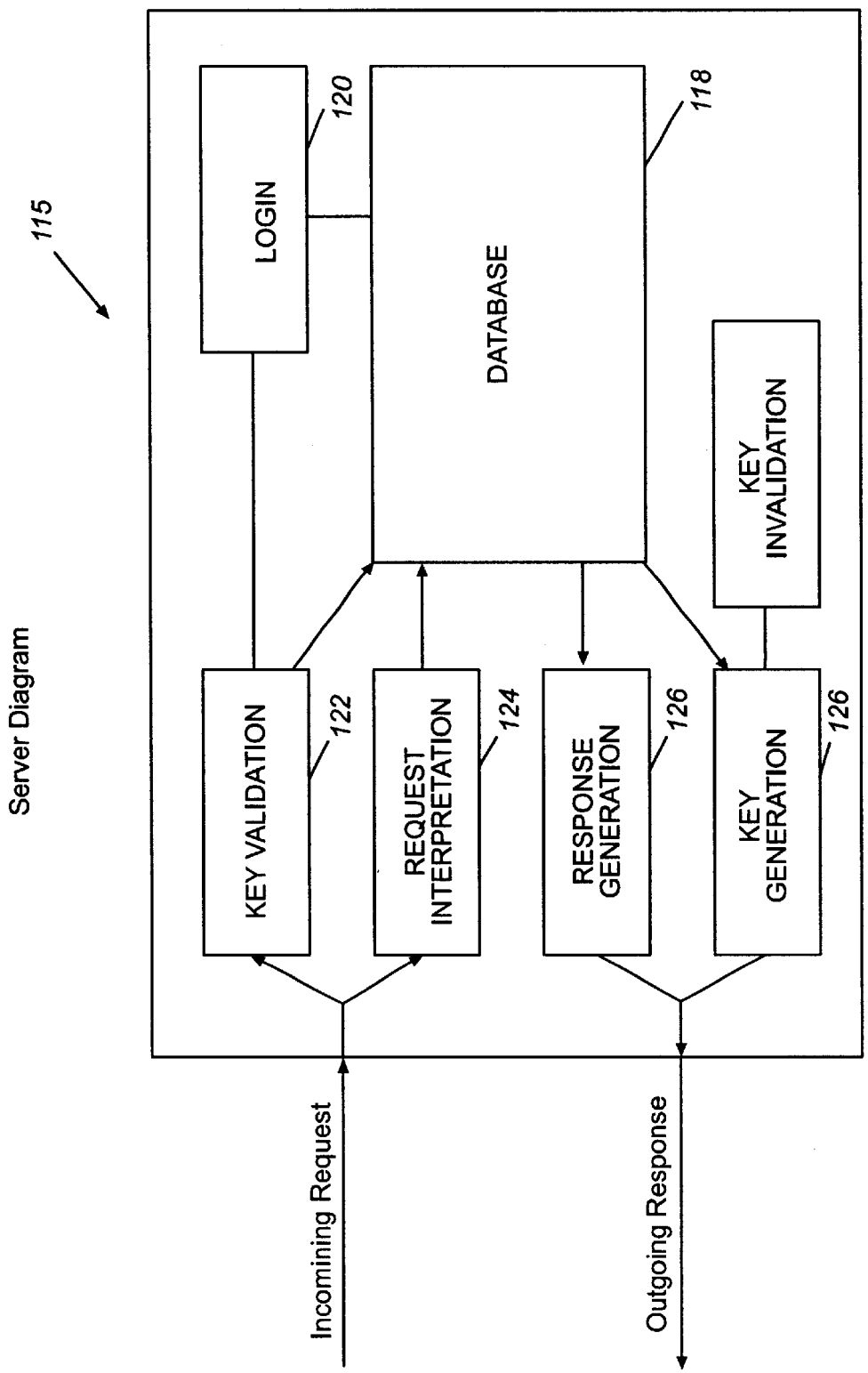
FIG. 5 is a block diagram showing a system of the present invention utilized in the method shown in FIGS. 3 and 4.

FIG. 5 shows a server system 115 used to implement the preferred embodiment of the invention and illustrates the operation of the server 52. The functionality of the server 52 preferably is founded on the database 118 shown in the server system 115. Constant updating to the database 118 allows the system to act intelligently and thereby creates the emulation of a stateful environment across any request/response pairs for a given client.

There are preferably five processes performed by various system means implemented by the software of the server 52: key validation (process 122), request interpretation (process 124), response generation (process 126), and key generation (process 128). The discussion of the operation of the server 52 will be divided into two categories: (1) optimal authentication to the server and (2) steady-state operation.

The initial authentication verification (process 120) described in steps 70–76 of FIG. 3 preferably interacts with the database 118 by comparing authentication information with known values in the database 118. At this authentication juncture, it is preferably assumed that there is no valid key for the client 50 and one must be provided by the server 52 for the client 50 to continue. If the information provided is the same as that in the database 118, then the client 50 is authorized to continue. At this point, the server 52 preferably generates a random identifier value to store in the database (step 128). As described previously, this value, referred to hereinafter as a "key," is a string of letters and/or numbers of a desired length. After the key has been generated, the server 52 preferably sends login verification and the first key 74 to the client 50.

After a connection is established between the client 50 and server 52, a 20 steady-state operation begins, and the server 52 waits for two items of information from the client: (1) a request 90 for data and (2) a previously sent key 92. The server 52 first evaluates any new connections from clients and checks any incoming keys that are received (process 122). If the server 52 does not find a key 92, the server generates a response (process 126) that directs the client 50 to login to the system using process 120. State at this point would be "server0" for that connection. If no login sequence is utilized, the server 52 directs the client 50 to some other starting state through which a first key 74 can be generated or assigned to recognize the user or client 50.

If the server 52 receives a key 92 of the proper format, the key validation (process 122) continues by interfacing with the database 118. Preferably, the value of the key 92 is first compared with a plurality of key values stored in the database 118. If none of the values match, the key and client are not "recognized" and the server 52 operates as it did when no key was sent. If the value is recognized, then the process preferably continues to determine if the key has been "timed-out." Preferably, key values stored in the database 118 are associated with a date and time value after which the key is no longer valid.

These time values are preferably based on the time and/or date of creation of each key. The server ignores keys in the database created before a certain date or time. In the preferred embodiment, particular keys are preferably valid for less than one hour. This is an additional security measure which ensures that the key transmitted is being sent by the authorized user and that the state associated with the key remains "fresh."

Without this device, an unauthorized user could, for example, make a connection with the server 52 several days later, send a new request 90 with the previously sent key 92, and continue where the authorized user left off. If the time when the key 92 is received by the database 118 is earlier than the "time-out" time period, then the key 92 is deemed valid. Again, if no valid or non-timed-out key is found, the client 50 must log in to the server 52 again.

Before the response is sent back to the client 50, the server 52 generates a new key (process 128) by generating a new random key string of set length. This is the new key 106. The key generation procedure preferably stores the value of the key 106 in the database 118 along with the present state of communications with this particular client, thus replacing the old key 92. Implicitly, the old key 92 is invalidated since it is no longer stored in the database 118. Other methods can be utilized by the server to ensure that the value of the old key 92 is not reused. This may entail storing the value in the database and comparing the new key 106 with a list of used keys, discarding the used keys, or retrieving keys to be used from a finite, stored set of keys and discarding them after use.

The server 52 completes its connection with the client 50 by sending back to the client 50 the new key 106 and the response 108 and terminates the connection. At this stage, the server 52 is free to make a connection with another client and repeat the same processes. When the client 50 establishes another connection with the server 52, the client 50 will not have to resend the state information describing what has already taken place since this data is stored in the server's database 118 in association with new key 106. Rather, the transmission of key 106 to the server will forego the need for a relogin or a retransmission of state information.

The key validation process (122) and key generation process (128) allow the server 52 to behave in an intelligent and efficient manner. The preferred embodiment herein solves many communication inefficiencies that would otherwise occur. For example, various problems may be incurred if a client sent the same request twice in prior art systems. Prior art servers would not be storing any state information, and the client would send all the state information and the server would have no "memory" of what happened previously. Since each transaction is completely independent, the results of the request would be duplicated. In some cases, multiple sets of goods could be mistakenly ordered, database data could conflict, or sensitive information could be disseminated. Furthermore, because information about state is stored on a server, critical state information may be stored in a physically stable environment. This becomes important should client hardware fail, or should the client switch hardware.

Using the secure tracking method described, each request appears to the user of the client not to be independent. While the client-server environment is still stateless, the server 52 "remembers" what the client has previously done by storing information identified by the key 92. Thus, the present embodiment can solve these multiple request dilemmas by maintaining the database 118. Here, for example, the server 52 could clear the stored information in the database after a product is purchased, or trigger a warning or other subroutine should a request be made more than once.

Figure 6:
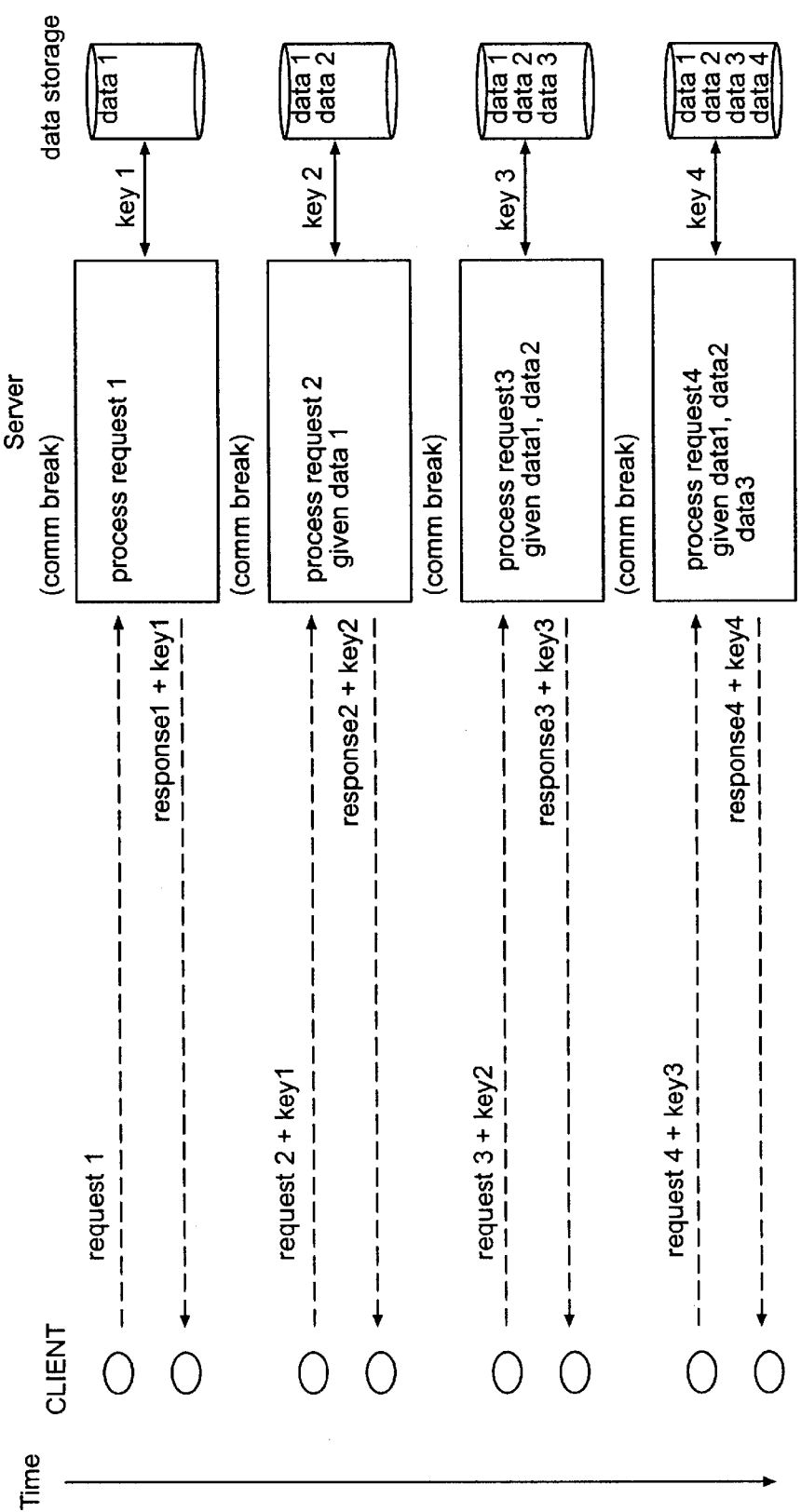
FIG. 6 is a state diagram similar to that of FIG. 2 showing exchanges between the client and the server during an operating example of the present invention of FIGS. 3–5.

FIG. 6 shows a state diagram illustrating communications between the client 50 and the server 52, and the advantages of the presently preferred embodiment as compared with the prior art may be more easily seen. In particular, comparison should be made with the state diagram of FIG. 2. FIG. 6 shows four request and response pairs for particular requests made by the client of the server. The four request and response pairs are preferably separated by breaks in the communication link between the client and the server after a particular response is received by the client. As shown in this example, an initial request (request 1) is sent by the client to the server. The server processes request 1 and generates a key (key 1) that represents the state of communications. The present state of communications between this particular client and the server is stored in the data storage area (data 1) in association with key 1. The server then sends the response (response 1) to the request along with key 1 back to the client. Communications are then broken. Preferably, after a short period of time passes, the client sends a second request (request 2) to the server along with the key (key 1) which was sent by the server to the client during the previous communication. The server processes request 2 and generates a response (response 2) based on the state of previous communications (data 1) which has been retrieved from the data storage area using the key 1 which was sent to the server with request 2. Using data 1, the server produces a response 2 and a generates a new key. The new key (key 2) now represents the present state of communications, which has been stored as data 1 and data 2 in the data storage area. The key 2 and response 2 are then sent back to the client.

Next, the client sends a third request (request 3) and the previously sent second key (key 2) to the server. The server processes request 3 given the data elating to the previous communications which has been retrieved using key 2. Again, the server generates a third key which it associates with stored data relating to the previous communications (data 1, data 2 and data 3). The response (response 3) and the new key (key 3) is then sent back to the client, and the operation continues.

Note that as time moves forward, the amount of information sent with new requests to the server remains substantially constant, and that all that is sent is a key which represents data at the server containing the state of previous communications or information from those previous communications. Thus, preferably most or all of the information which is required for subsequent processing by the server is kept at the server, and the need for retransmission of information is preferably eliminated.

Preferably, the system and method of the preferred embodiment is implemented partially on software running on the server 52. The software preferably implements the Java Virtual Machine®, a proprietary software module of Sun Microsystems, Inc.; and operates using the general steps as will be described below.

Figure 7:
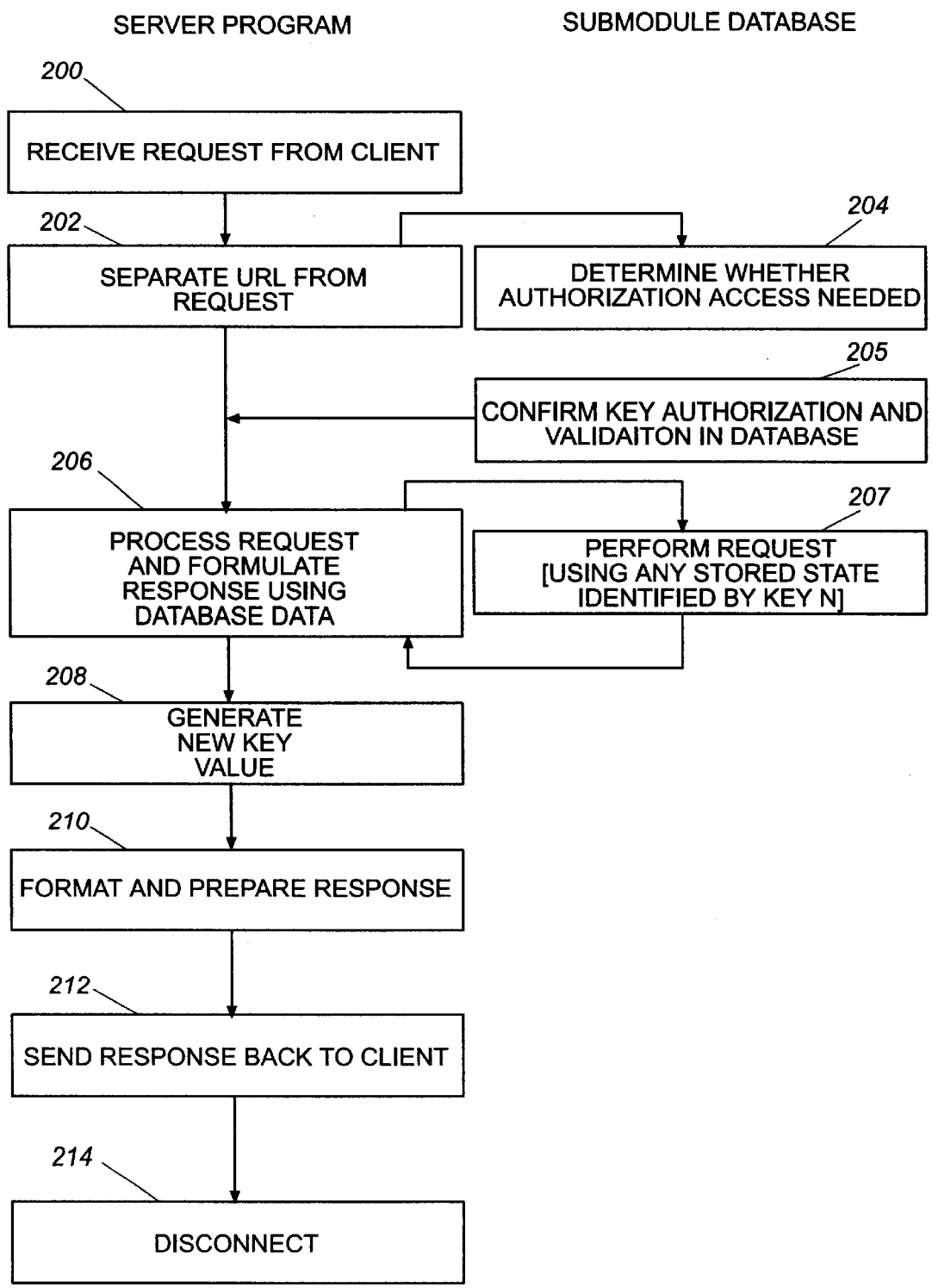
FIG. 7 is a flow diagram of the steps undertaken by the software implementation of the preferred embodiment of the method of FIGS. 3 and 4.

FIG. 7 shows a high-level flow diagram of the various steps undertaken by the software in implementing the method of the preferred embodiment. As shown in box 200, the server 52 first receives an entire request from the client 50, while leaving the new HTTP connection open. As shown in box 202, the server then separates the URL from the request and hands off processing to a submodule in the software that performs the key authentication steps. As shown in box 204, if the submodule requires specific authorization or access to data previously related to the present session with the present client, the key which was sent with the request is separated from the request and verified (box 205). As described above, verification preferably consists of, but is not limited to, checking for the particular key in a database of known previously issued keys and checking to ensure that the key was issued within a predetermined amount of time. Next, the server continues to process the request (box 206), forming a response and using any and all data sources available to it, including calls to other databases (207). Some of the data sources may require the transmitted key in order to retrieve data. The server then generates a new key value (208).

As shown in box 210, the server 52 then bundles the new key value with other relevant information into a response appropriately formatted for transmission back to the client 50. The server sends the response back to the client along the open HTTP connection (box 212). As shown in box 214, once successful delivery is reasonably assured, the server 52 and the client 50 drop their mutual connection and the server 52 updates the local data base of the valid keys, replacing the old key with the new key value.

The objects for this software implementation are included in the Microfiche Appendix attached hereto, and the Java summary documents containing related object hierarchy are also included. One skilled in the art can readily utilize known methods, software and systems to implement the embodiment as described herein and exampled in the source code provided in the attached Microfiche Appendix.

Of course, it should be understood that a wide range of changes and modifications can be made to the preferred embodiments described above. For example, the method and system described herein should not be limited to the Internet. Indeed, the system and method may be implemented on any type of network, including private intranets or semi-permanent cellular or wired networks. Furthermore, one skilled in the art would recognize that a wide variety of software and hardware platforms may be utilized to implement the present invention. It is therefore intended that the foregoing detailed description be regarded as illustrative rather than limiting and that it be understood that it is the following claims, including all equivalents, which are intended to define the scope of this invention.

I claim:

1. A method for tracking communications in a stateless client-server environment, said method comprising the steps of:

sending a first request from said client to said server over a first link;

sending a first identifier from said server to said client over said first link;

sending said first identifier from said client and a second request to said server over a second link; and sending a response to said second request and a second identifier distinct from said first identifier from said server to said client over said second link.

2. The method of claim 1 further comprising the step of replacing said first identifier with a second identifier after said step of sending said first identifier from said client and a second request to said server over a second link.

3. The method of claim 2 wherein said step of replacing said first identifier with a second identifier further comprises invalidating said first identifier to prevent future use of said first identifier for a determined period of time.

4. The method of claim 3 wherein said step of invalidating said first identifier further comprises removing said identifier from a queue of available identifiers.

5. The method of claim 1 further comprising the step of disconnecting said first link after said step of sending said first identifier from said server to said client over said first link.

6. The method of claim 5 wherein said step of sending a first identifier from said server to said client further comprises the step of sending a response to said first request along with said first identifier to said client.

7. The method of claim 5 further comprising the step of authenticating said client after said step of sending a first request from said client to said server over a first link.

8. The method of claim 5 further comprising the step of authenticating said client after said step of sending said first identifier from said client and a second request to said server over a second link.

9. The method of claim 8 wherein said step of authenticating said client further comprises the steps of recognizing said first identifier and retrieving data relating to the state of said client linked to said first identifier.

10. The method of claim 9 wherein said step of recognizing said first identifier further comprises the steps of determining whether the age of said first identifier has exceeded a pre-determined time period of acceptability for said first identifier.

11. A method for tracking communications in a stateless client-server environment, said method comprising the steps of:

receiving a first request from a client over a first link;

sending a first identifier to said client over said first link;

receiving said first identifier from said client and a second request over a second link; and sending a response to said second request and a second identifier distinct from said first identifier to said client over said second link.

12. The method of claim 11 further comprising the step of replacing said first identifier with a second identifier after said step of receiving said first identifier from said client and a second request over said second link.

13. The method of claim 12 wherein said step of replacing said first identifier with a second identifier further comprises invalidating said first identifier to prevent future use of said first identifier for a determined period of time.

14. The method of claim 13 wherein said step of invalidating said first identifier further comprises removing said identifier from a queue of available identifiers.

15. The method of claim 11 further comprising the step of disconnecting said first link after said step of sending said first identifier to said client over said first link.

16. The method of claim 15 wherein said step of sending said first identifier to said client further comprises the step of sending a response to said first request along with said first identifier to said client.

17. The method of claim 15 further comprising the step of authenticating said client after said step of receiving a first request from said client over said first link.

18. The method of claim 15 further comprising the step of authenticating said client after said step of receiving said first identifier from said client and a second request over a second link.

19. The method of claim 18 wherein said step of authenticating said client further comprises the steps of recognizing said first identifier and retrieving data relating to the state of said client linked to said first identifier.

20. The method of claim 19 wherein said identifier further comprises values independently nonindicative of said data relating to the state of said client.

21. The method of claim 19 wherein said step of recognizing said first identifier further comprises the steps of determining whether the age of said first identifier has exceeded a pre-determined time period of acceptability for said first identifier.

22. A method for tracking communications in a client-server environment, said method comprising the steps of:

establishing a first connection between a client and a server;

authenticating said client at said server;

generating a first key in the server corresponding to a session between said client and said server, said first key being stored at said server;

sending said first key to said client;

disconnecting said first connection between said client and said server;

establishing a second connection between said client and said server;

generating a request at said client and sending said request and said first key to said server through said second connection;

verifying said first key at said server;

generating a response to said request and a second key at said server; and sending said response and said second key back to said client over said second connection.

23. The method of claim 22 further comprising the step of retaining a value representative of said first key in memory at the client.

24. The method of claim 22 further comprising the step of replacing said first key at said server with a second key after verifying said first key at said server.

25. The method of claim 24 further comprising the step of invalidating said first key before replacing said first key with a second key.

26. The method of claim 22 wherein the step of authenticating said client further comprises the steps of:

providing a user name for said client and a password indicative of said user name to the server; and verifying said password in the server against a plurality of known password associations.

27. The method of claim 26 wherein said steps of generating said keys further comprise the steps of:

providing a set of distinct random keys;

choosing a selected key from said set; and removing said selected key from said set.

28. The method of claim 27 further comprising the steps of confirming that said second key is distinct from said first key before said step of sending said second key to said client.

29. The method of claim 27 further comprising the step of retaining all of said keys in a memory at the server to ensure that all keys generated by said server are distinct.

30. The method of claim 27 wherein said keys further comprise a random string having a defined length.

31. The method of claim 22 wherein said client further comprises a personal computer terminal.

32. The method of claim 31 wherein said server further comprises a server operating to exchange information with a database.

33. The method of claim 22 wherein said keys and said response are encrypted before being sent to said client or said server.

34. The method of claim 30 wherein said first and second keys bear no sequential relationship to each other.

35. The method of claim 22 wherein said step of verifying said first random key further comprises the steps of associating said random key with a list of stored random keys at said server.

36. The method of claim 35 further comprising the step of monitoring the elapsed time between the receipt of said second key and an input from said client.

37. The method of claim 36 further comprising the step of invalidating said first random key if said elapsed time exceeds a pre-set value of time.

38. A system for authentication in a stateless client-server environment, said system comprising:

a client computer, the client computer operative to establish a connection with a server computer;

a server computer operative to communicate with said client computer, said server including key generator means generating a plurality of keys for transmission to said client, verification means in communication with said key generator means, said verification means receiving said keys from said client to recognize said keys at the server, and invalidating means linked to said key generator means, said invalidating means preventing further use of previously transmitted keys.

39. The system of claim 38 wherein said server further comprises a network server operating in communication with the Internet.

40. The system of claim 39 wherein said client further comprises a personal computer, said terminal connection with said server being established via the Internet.

41. The system of claim 40 further comprising a database linked to said server for storing information to be requested by said client.

42. The system of claim 41 further comprising a hypertext interface implemented on said client.

43. The system of claim 42 further comprising means for selecting and retrieving information from said database based on requests made by said client.

44. A method for tracking communications in a client-server environment, said method comprising the steps of:

establishing a first connection between a client and a server;

generating a first key in the server corresponding to a session between said client and said server;

sending said first key to said client;

disconnecting said first connection between said client and said server;

establishing a second connection between said client and said server;

generating a request at said client and sending said request and said first key to said server through said second connection;

recognizing said first key at said server;

generating a second key at said server, said second key being unrelated to said first key;

processing said request of said client at said server to generate a response;

sending said response and said second key back to said client over said second connection; and disconnecting said second connection between said client and said server.

45. The method of claim 44 wherein said second key is utilized by said server to link said client to information relating to said session.

46. The method of claim 44 wherein said first connection is established after recognizing an authorized user to the server.

47. The method of claim 46 further comprising the step of invalidating keys received from the client after said keys are recognized by the server.

48. The method of claim 44 wherein said connection is established through the Internet.

49. The method of claim 44 wherein said client further comprises a browser interface program.

50. A method for tracking communications in a client-server environment, said method comprising the steps of:

establishing a connection between a client and a server;

receiving a first key from said server;

generating a request at said client;

sending said request and said first key to said server through said connection; and receiving a response to said request and a new key from said server over said connection.

51. A method for tracking communications in a client-server environment, said method comprising the steps of:

establishing a connection between a client and a server;

receiving an initial key from said server;

generating a request at said client;

sending said request and said initial key to said server through said connection;

utilizing said initial key to recall client's state information at said server;

generating a response to said request in said server;

generating a new key in said server;

sending said response and said new key back to said client over said connection.

52. A method for tracking communication in a stateless client-server computer environment, said method comprising:

establishing a first connection between a client and a server;

providing a user name for said client and a password indicative of said user to the server;

validating said password;

generating a first key in the server corresponding to a session between said client and said server, said first key being stored at said server;

sending said first random key to said client;

disconnecting said first connection between said client and said server.

53. A method for tracking communications in a client-server environment in which a character string called a key uniquely identifies stored state information of the client in a server database, said method comprising the steps of:

sending a request and a key to said server through an established connection;

verifying said key by comparing its value with a value stored in said database;

generating a new key by selecting an unused string of a desired length;

invalidating said previously sent key; and sending said new key to said client over said connection.

* * * * *